United States Patent
Morita et al.

(10) Patent No.: US 11,312,929 B2
(45) Date of Patent: Apr. 26, 2022

(54) METHOD FOR PRODUCING BEVERAGE AND METHOD FOR IMPROVING FLAVOR OF BEVERAGE

(71) Applicant: Sapporo Holdings Limited, Tokyo (JP)

(72) Inventors: Susumu Morita, Tokyo (JP); Tomokazu Takaoka, Tokyo (JP); Hideo Harada, Tokyo (JP); Nobuchika Ishibashi, Tokyo (JP); Hajime Kanda, Tokyo (JP); Ryuma Ikutani, Tokyo (JP)

(73) Assignee: Sapporo Breweries Limited, Tokyo (JP)

(*) Notice: Subject to any disclaimer, the term of this patent is extended or adjusted under 35 U.S.C. 154(b) by 27 days.

(21) Appl. No.: 16/080,906

(22) PCT Filed: Feb. 6, 2017

(86) PCT No.: PCT/JP2017/004242
§ 371 (c)(1),
(2) Date: Aug. 29, 2018

(87) PCT Pub. No.: WO2017/150082
PCT Pub. Date: Sep. 8, 2017

(65) Prior Publication Data
US 2019/0119613 A1 Apr. 25, 2019

(30) Foreign Application Priority Data
Mar. 2, 2016 (JP) .............................. JP2016-040013

(51) Int. Cl.
*C12C 3/00* (2006.01)
*C12C 11/00* (2006.01)
*A23L 2/00* (2006.01)

(52) U.S. Cl.
CPC .................... *C12C 3/00* (2013.01); *A23L 2/00* (2013.01); *C12C 11/00* (2013.01)

(58) Field of Classification Search
CPC ................ C12C 3/00; C12C 11/00
See application file for complete search history.

(56) References Cited

U.S. PATENT DOCUMENTS

| 2,159,985 | A | * | 5/1939 | Gray | ........................ | C12H 1/14 |
| | | | | | | 426/268 |
| 4,401,684 | A | * | 8/1983 | Versluys | .................. | C12C 3/04 |
| | | | | | | 426/546 |

(Continued)

FOREIGN PATENT DOCUMENTS

| EP | 2380967 A1 * | 10/2011 | ............ C12C 12/04 |
| JP | 2010-178628 A | 8/2010 | |

(Continued)

OTHER PUBLICATIONS

English translation of JP2010178628 (Year: 2010).*

(Continued)

*Primary Examiner* — Katherine D Leblanc
(74) *Attorney, Agent, or Firm* — Morgan, Lewis & Bockius LLP

(57) ABSTRACT

Provided are a method of producing a beverage and a method of improving a flavor of a beverage by each of which the imparting of an undesirable aroma is suppressed. The method of producing a beverage according to one embodiment of the present invention is a method of producing a beverage using a raw material liquid, including adding hops that have been subjected to acid treatment to the raw material liquid. The method of improving a flavor of a beverage according to one embodiment of the present invention is a method of improving a flavor of a beverage to be produced using a raw material liquid, including adding hops (Continued)

| | | EXAMPLE 1-1 | EXAMPLE 1-2 | EXAMPLE 1-3 | EXAMPLE 1-4 | EXAMPLE 1-5 |
|---|---|---|---|---|---|---|
| ACID ADDITION AMOUNT(w/v%) | | 0.00 | 0.10 | 0.25 | 0.50 | 2.00 |
| pH | TREATMENT LIQUID | 7.3 | 3.0 | 2.7 | 2.5 | 2.2 |
| | TREATMENT LIQUID +HOPS | 5.7 | 5.2 | 4.6 | 4.0 | 3.2 |
| | TREATMENT LIQUID +HOPS+RAW MATERIAL LIQUID | 5.3 | 5.2 | 5.2 | 5.1 | 4.6 |
| SENSORY EVALUATION | SMOOTH FEELING | 1.0 | 1.6 | 3.2 | 4.4 | 4.4 |
| | BEER-LIKE TASTE | 2.0 | 2.8 | 4.2 | 4.6 | 3.4 |
| | BITTER HARSHNESS | 5.0 | 4.2 | 2.0 | 1.2 | 1.0 |
| | RESINOUS ODOR | 5.0 | 4.6 | 2.4 | 1.2 | 1.0 |
| ACETALDEHYDE CONTENT(ppm) | | 6.6 | 4.7 | 3.5 | 0.7 | 0.7 | that have been subjected to acid treatment to the raw material liquid, to thereby improve the flavor of the beverage.

20 Claims, 5 Drawing Sheets

(56) References Cited

U.S. PATENT DOCUMENTS

| | | | | |
|---|---|---|---|---|
| 4,622,224 A * | 11/1986 | Owades | ................... | C12C 12/04 426/16 |
| 5,230,916 A * | 7/1993 | Chang | ................... | A61K 8/676 426/330.6 |
| 7,144,592 B2 * | 12/2006 | Rader | ...................... | C12C 3/10 426/29 |
| 2009/0068309 A1 * | 3/2009 | Klisch | .................... | C12C 12/00 426/16 |
| 2018/0087011 A1 | 3/2018 | Imashuku | | |

FOREIGN PATENT DOCUMENTS

| | | |
|---|---|---|
| JP | 2013-135648 A | 7/2013 |
| JP | 2014-129299 A | 7/2014 |
| WO | 2016/143496 A1 | 9/2016 |

OTHER PUBLICATIONS

"L-ascorbic acid" From the Sigma Aldrich website. Retrieved Jan. 30, 2021 https://www.sigmaaldrich.com/catalog/product/sial/a92902?lang=en&region=US&utm_medium=cpc&utm_source=bing&utm_term=l-acid%20ascorbic&utm_campaign=SIAL%20Position%20Support%20Global%20(Bing%20ebizpfs)&utm_content=sial/a92902 (Year: 2021).*

International Search Report issued in corresponding International Patent Application No. PCT/JP2017/004242 dated Apr. 18, 2017.

Million, "Dry Hopping Techniques," Sep. 2003 (https://byo.com/mead/item/569-dry-hopping-techniques).

Office Action issued in corresponding Japanese Patent Application No. 2016-040013 dated Feb. 25, 2020 (see partial English translation).

\* cited by examiner

FIG.1

|  |  | EXAMPLE 1-1 | EXAMPLE 1-2 | EXAMPLE 1-3 | EXAMPLE 1-4 | EXAMPLE 1-5 |
|---|---|---|---|---|---|---|
| ACID ADDITION AMOUNT(w/v%) | | 0.00 | 0.10 | 0.25 | 0.50 | 2.00 |
| pH | TREATMENT LIQUID | 7.3 | 3.0 | 2.7 | 2.5 | 2.2 |
| | TREATMENT LIQUID +HOPS | 5.7 | 5.2 | 4.6 | 4.0 | 3.2 |
| | TREATMENT LIQUID +HOPS+RAW MATERIAL LIQUID | 5.3 | 5.2 | 5.2 | 5.1 | 4.6 |
| SENSORY EVALUATION | SMOOTH FEELING | 1.0 | 1.6 | 3.2 | 4.4 | 4.4 |
| | BEER-LIKE TASTE | 2.0 | 2.8 | 4.2 | 4.6 | 3.4 |
| | BITTER HARSHNESS | 5.0 | 4.2 | 2.0 | 1.2 | 1.0 |
| | RESINOUS ODOR | 5.0 | 4.6 | 2.4 | 1.2 | 1.0 |
| ACETALDEHYDE CONTENT(ppm) | | 6.6 | 4.7 | 3.5 | 0.7 | 0.7 |

FIG.2

|  |  | EXAMPLE 2-1 | EXAMPLE 2-2 | EXAMPLE 2-3 | EXAMPLE 2-4 | EXAMPLE 2-5 |
|---|---|---|---|---|---|---|
| ACID ADDITION AMOUNT(w/v%) | | 0.00 | 0.10 | 0.25 | 0.50 | 2.00 |
| SENSORY EVALUATION | SMOOTH FEELING | 1.0 | 1.7 | 2.7 | 3.3 | 4.0 |
| | BEER-LIKE TASTE | 1.3 | 1.7 | 2.3 | 3.0 | 3.3 |
| | BITTER HARSHNESS | 5.0 | 4.3 | 2.7 | 2.0 | 1.3 |
| | RESINOUS ODOR | 1.0 | 1.3 | 1.3 | 1.7 | 2.0 |

FIG.3

|  |  | EXAMPLE 3-1 | EXAMPLE 3-2 | EXAMPLE 3-3 | EXAMPLE 3-4 |
|---|---|---|---|---|---|
| KIND OF ACID | | NONE ADDED | LACTIC ACID | PHOSPHORIC ACID | MALIC ACID |
| SENSORY EVALUATION | SMOOTH FEELING | 1.0 | 4.4 | 4.0 | 3.7 |
| | BEER-LIKE TASTE | 2.0 | 4.6 | 4.7 | 4.7 |
| | BITTER HARSHNESS | 5.0 | 1.2 | 1.3 | 1.3 |
| | RESINOUS ODOR | 5.0 | 1.2 | 1.3 | 1.3 |

FIG.4A

| | | EXAMPLE 4-1 | EXAMPLE 4-2 | EXAMPLE 4-3 | EXAMPLE 4-4 | EXAMPLE 4-5 | EXAMPLE 4-6 | EXAMPLE 4-7 |
|---|---|---|---|---|---|---|---|---|
| HOP VARIETY | | Galaxy | Citra | Polaris | Apollo | Saaz | Traditon | Sorachi Ace |
| SENSORY EVALUATION | SMOOTH FEELING | 1.0 / 3.7 | 1.3 / 4.3 | 1.0 / 3.0 | 2.3 / 4.0 | 2.3 / 3.7 | 2.0 / 3.0 | 1.3 / 3.7 |
| | BEER-LIKE TASTE | 1.7 / 4.0 | 2.3 / 4.7 | 1.7 / 3.3 | 2.7 / 4.0 | 2.7 / 4.0 | 3.0 / 3.3 | 2.3 / 4.0 |
| | BITTER HARSHNESS | 4.7 / 3.0 | 4.3 / 1.3 | 5.0 / 3.0 | 3.7 / 2.0 | 3.7 / 3.0 | 3.3 / 2.7 | 4.3 / 2.7 |
| | RESINOUS ODOR | 4.3 / 2.0 | 5.0 / 2.0 | 3.7 / 2.7 | 3.7 / 1.7 | 3.7 / 2.3 | 3.3 / 2.3 | 3.7 / 2.0 |

FIG.4B

| HOP VARIETY | | EXAMPLE 4-8 | EXAMPLE 4-9 | EXAMPLE 4-9 | EXAMPLE 4-10 | EXAMPLE 4-10 | EXAMPLE 4-11 | EXAMPLE 4-12 | EXAMPLE 4-12 | EXAMPLE 4-13 | EXAMPLE 4-13 | EXAMPLE 4-14 |
|---|---|---|---|---|---|---|---|---|---|---|---|---|
| HOP VARIETY | | Barbe Rouge | Mandarina Bavaria | Mandarina Bavaria | Mosaic | Mosaic | Nelson Sauvin | SHINSHUWASE | SHINSHUWASE | FURANO NO.18 | FURANO NO.18 | LITTLE STAR |
| SENSORY EVALUATION | SMOOTH FEELING | 2.0 | 2.7 | 1.3 | 3.7 | 1.3 | 3.7 | 1.0 | 3.7 | 2.3 | 3.7 | 2.0 | 3.7 | 3.3 |
| SENSORY EVALUATION | BEER-LIKE TASTE | 2.7 | 3.3 | 2.0 | 4.0 | 2.0 | 4.0 | 1.7 | 3.7 | 2.7 | 4.0 | 2.0 | 3.3 | 3.3 |
| SENSORY EVALUATION | BITTER HARSHNESS | 4.0 | 3.3 | 4.3 | 1.3 | 3.7 | 1.3 | 5.0 | 2.3 | 3.7 | 2.3 | 4.7 | 2.7 | 4.0 | 2.7 |
| SENSORY EVALUATION | RESINOUS ODOR | 3.7 | 2.3 | 3.7 | 2.0 | 4.3 | 1.3 | 4.7 | 2.3 | 3.7 | 2.3 | 3.3 | 2.7 | 4.0 | 2.7 |

FIG.5

|  |  | EXAMPLE 5-1 | EXAMPLE 5-2 |
|---|---|---|---|
| TIME OF ADDITION OF ACID-TREATED HOPS | | IMMEDIATELY BEFORE START OF FERMENTATION | DURING FERMENTATION |
| SENSORY EVALUATION | SMOOTH FEELING | 4.4 | 3.3 |
| | BEER-LIKE TASTE | 4.6 | 3.0 |
| | BITTER HARSHNESS | 1.2 | 2.3 |
| | RESINOUS ODOR | 1.2 | 1.0 |

FIG.6

| | | EXAMPLE 6-1 | EXAMPLE 6-2 | EXAMPLE 6-3 | EXAMPLE 6-4 |
|---|---|---|---|---|---|
| HEATING CONDITIONS DURING ACID TREATMENT | | NO HEATING | 60°C/30 MIN | 90°C/30 MIN | 90°C/1 MIN |
| SENSORY EVALUATION | SMOOTH FEELING | 4.4 | 4.0 | 4.0 | 4.0 |
| | BEER-LIKE TASTE | 4.6 | 4.7 | 5.0 | 4.3 |
| | AROMA UNIQUE TO FLAVOR HOPS | 3.0 | 4.0 | 4.7 | 4.3 |
| | BITTER HARSHNESS | 1.2 | 1.3 | 1.3 | 1.7 |
| | RESINOUS ODOR | 1.2 | 1.0 | 1.3 | 1.7 |

METHOD FOR PRODUCING BEVERAGE AND METHOD FOR IMPROVING FLAVOR OF BEVERAGE

TECHNICAL FIELD

The present invention relates to a method of producing a beverage and a method of improving a flavor of a beverage.

BACKGROUND ART

In production of beer, dry hopping, which involves adding hops after boiling and cooling of wort, is sometimes performed as described in Non Patent Literature 1.

CITATION LIST

Non Patent Literature

[Non Patent Literature 1] Donald Million, Dry Hopping: Techniques, September 2003 (https://byo.com/mead/item/569-dry-hopping-techniques)

SUMMARY OF INVENTION

Technical Problem

However, the related-art dry hopping has a problem of imparting an undesirable aroma as well as a preferred aroma derived from hops.

The present invention has been made in view of the above-mentioned problem, and one of the objects of the present invention is to provide a method of producing a beverage and a method of improving a flavor of a beverage by each of which the impartment of an undesirable aroma is suppressed.

Solution to Problem

In order to solve the above-mentioned problem, a method of producing a beverage according to one embodiment of the present invention is a method of producing a beverage using a raw material liquid, including adding hops that have been subjected to acid treatment to the raw material liquid. According to the one embodiment of the present invention, the method of producing a beverage by which the impartment of an undesirable aroma is suppressed is provided.

In addition, in the method, the hops that have been subjected to the acid treatment may be added to the raw material liquid prepared through cooling after heating. In addition, in the method, the acid treatment may include treatment involving mixing an acid solution and hops. In this case, the acid solution may have a pH of 6.0 or less.

In addition, the method may further include adding yeast to the raw material liquid prepared through cooling after heating to perform alcoholic fermentation. In this case, in the method, the hops that have been subjected to the acid treatment may be added by end of the alcoholic fermentation.

In addition, when the method includes performing the alcoholic fermentation, the method may further include performing maturation after the alcoholic fermentation, wherein the hops that have been subjected to the acid treatment may be added before start of the maturation.

In addition, in the method, the beverage may be a beer-taste beverage. In addition, the method may be free of heat sterilization after the hops that have been subjected to the acid treatment is added to the raw material liquid.

In order to solve the above-mentioned problem, a method of improving a flavor of a beverage according to one embodiment of the present invention is a method of improving a flavor of a beverage to be produced using a raw material liquid, including adding hops that have been subjected to acid treatment to the raw material liquid, to thereby improve the flavor of the beverage. According to the one embodiment of the present invention, the method of improving a flavor of a beverage by which the impartment of an undesirable aroma is suppressed is provided.

Advantageous Effects of Invention

According to one embodiment of the present invention, a method of producing a beverage and a method of improving a flavor of a beverage by each of which the impartment of an undesirable aroma is suppressed are provided.

BRIEF DESCRIPTION OF DRAWINGS

FIG. 1 is an explanatory diagram for showing the results of sensory evaluation of beverages in Example 1 according to one embodiment of the present invention.

FIG. 2 is an explanatory diagram for showing the results of sensory evaluation of beverages in Example 2 according to one embodiment of the present invention.

FIG. 3 is an explanatory diagram for showing the results of sensory evaluation of beverages in Example 3 according to one embodiment of the present invention.

FIG. 4A is an explanatory diagram for showing examples of the results of sensory evaluation of beverages in Example 4 according to one embodiment of the present invention.

FIG. 4B is an explanatory diagram for showing other examples of the results of sensory evaluation of beverages in Example 4 according to one embodiment of the present invention.

FIG. 5 is an explanatory diagram for showing the results of sensory evaluation of beverages in Example 5 according to one embodiment of the present invention.

FIG. 6 is an explanatory diagram for showing the results of sensory evaluation of beverages in Example 6 according to one embodiment of the present invention.

DESCRIPTION OF EMBODIMENTS

Now, embodiments of the present invention will be described. The present invention is not limited to these embodiments.

A method of producing a beverage according to one embodiment of the present invention (hereinafter referred to as "method of the present invention") is a method of producing a beverage using a raw material liquid, including adding hops that have been subjected to acid treatment to the raw material liquid.

That is, the inventors of the present invention have carried out extensive investigations on a dry hopping technique, and as a result, have independently found that dry hopping in which the imparting of an undesirable aroma is suppressed (more specifically, for example, dry hopping that effectively imparts a preferred aroma while suppressing the imparting of an undesirable aroma) is achieved by using hops that have been subjected to acid treatment in advance. Thus, the inventors have completed the present invention.

Therefore, this embodiment also encompasses a method of improving a flavor of a beverage to be produced using a raw material liquid, including adding hops that have been subjected to acid treatment to the raw material liquid, to thereby improve the flavor of the beverage.

The acid treatment of the hops is not particularly limited as long as the acid treatment is a treatment involving keeping the hops under an acidic condition. The acid treatment is preferably, for example, a treatment involving mixing an acid solution (hereinafter referred to as "treatment liquid") and the hops. That is, in this case, the acid treatment of the hops is performed by mixing the treatment liquid and the hops, and keeping the hops immersed in the treatment liquid.

The pH of the treatment liquid is not particularly limited as long as the pH falls within an acidic range (for example, 6.9 or less). The pH may be, for example, 6.0 or less, 5.0 or less, or 4.0 or less. In addition, the pH of the treatment liquid is preferably 3.5 or less. Further, in this case, the pH of the treatment liquid is preferably 3.0 or less, more preferably 2.9 or less, still more preferably 2.7 or less, particularly preferably 2.6 or less. The lower limit value of the pH of the treatment liquid is not particularly limited, and the pH may be, for example, 1.0 or more.

The treatment liquid is preferably an aqueous solution containing an acid. That is, in this case, the treatment liquid is an aqueous solution prepared by adding an acid. The acid contained in the treatment liquid is not particularly limited as long as its addition lowers the pH of the aqueous solution. For example, the acid may be one or more selected from a group consisting of lactic acid, phosphoric acid, malic acid, sulfurous anhydride, tartaric acid, acetic acid, and citric acid, and is preferably one or more selected from a group consisting of lactic acid, phosphoric acid, malic acid, sulfurous anhydride, and tartaric acid.

The treatment liquid may have, for example, an extract of 10 w/v % or less, 5 w/v % or less, or 1 w/v % or less. The extract (w/v %) of the treatment liquid is measured in accordance with a method described in the literature: "Methods of Analysis of BCOJ (Enlarged and Revised Edition) (2013) (edited by Brewery Convention of Japan (Analysis Committee), Brewers Association of Japan, publishing office: The Brewing Society of Japan)", "7.2 Extract".

The form of the hops to be subjected to the acid treatment is not particularly limited, and may be, for example, one or more selected from a group consisting of raw hops, pressed hops, hop powder, hop pellets, a hop extract, isomerized hops, low hops, tetra hops, and hexa hops. Of those, hop pellets are preferred.

The pressed hops are obtained by compressing dried hop cones. The hop powder is obtained by pulverizing dried hop cones. The hop pellets are obtained by compression-molding the hop powder into pellets. The hop extract is prepared by, for example, extracting components contained in hop cones with a solvent. The isomerized hops are obtained by subjecting hops to isomerization treatment, such as alkali treatment or heat treatment, to isomerize an α-acid. Reduced iso-α-acid products, such as low hops and tetra hops, are obtained by performing hydrogenation using an appropriate catalyst.

The variety of the hops to be subjected to the acid treatment is not particularly limited, and so-called flavor hops are preferably used. The flavor hops may be, for example, one or more selected from a group consisting of the Cascade variety, the Galaxy variety, the Citra variety, the Polaris variety, the Apollo variety, the Saaz variety, the Tradition variety, the Sorachi Ace variety, the Barbe Rouge variety, the Mandarina Bavaria variety, the Mosaic variety, the Nelson Sauvin variety, the Shinshuwase variety, the Furano No. 18 variety, and the Little Star variety.

The period of time of the acid treatment (for example, a period of time for which the hops are kept immersed in the treatment liquid) is not particularly limited as long as the period of time falls within a range in which the effect of the acid treatment is obtained. The period of time may be, for example, 3 minutes or more, or 5 minutes or more. The upper limit value of the period of time of the acid treatment is not particularly limited, and the period of time may be, for example, 48 hours or less, 24 hours or less, 12 hours or less, 8 hours or less, 4 hours or less, or 2 hours or less. When the period of time of the acid treatment is lengthened, there is a risk that a preferred aroma derived from the hops may change to an undesirable aroma. That is, as the period of time of the acid treatment becomes shorter, the imparting of an undesirable aroma derived from the hops is more effectively suppressed.

The temperature of the acid treatment (for example, a temperature at which the hops are kept immersed in the treatment liquid) is not particularly limited as long as the temperature falls within a range in which the effect of the acid treatment is obtained. The temperature may be, for example, 5° C. or more and 100° C. or less, 40° C. or more and 95° C. or less, or 50° C. or more and 90° C. or less.

In addition, the acid treatment may be performed at a relatively low temperature. In this case, the temperature of the acid treatment may be, for example, 5° C. or more and 40° C. or less, 10° C. or more and 30° C. or less, or 15° C. or more and 25° C. or less. Further, in this case, the acid treatment may be performed without heating. In those cases, the acid treatment of the hops is performed by a simple operation at low cost.

In addition, the acid treatment may be performed under heating. In this case, the temperature of the acid treatment may be, for example, 40° C. or more and 100° C. or less, 50° C. or more and 95° C. or less, or 60° C. or more and 90° C. or less. In this case, hops after acid treatment that effectively impart a preferred aroma specific to hops can be obtained.

The method of the present invention may include providing ready-for-use hops that have been subjected to acid treatment in advance (for example, providing hops that have been subjected to acid treatment that have been purchased from others) to be used, instead of including performing the acid treatment of the hops. However, the method of the present invention may further include subjecting hops to acid treatment as described above. That is, in this case, the method of the present invention includes subjecting hops to acid treatment, and adding the hops that have been subjected to the acid treatment to the raw material liquid.

Then, in the method of the present invention, the hops that have been subjected to the acid treatment as described above (hereinafter referred to as "acid-treated hops") are added to the raw material liquid. The raw material liquid is not particularly limited as long as the raw material liquid is one for use in the production of a beverage. The raw material liquid may be prepared, for example, using a raw material containing a plant raw material.

The plant raw material is not particularly limited as long as the plant raw material is a plant-derived raw material for use in the production of a beverage. The plant raw material may be, for example, one or more selected from a group consisting of the following items (i), (ii), and (iii): (i) one or more selected from a group consisting of grains (for example, one or more selected from a group consisting of barley and a barley-like plant, rice, and corn), beans, and potatoes; (ii) a product obtained by germinating one or more selected from the group of the item (i); and (iii) a component derived from one or both of the items (i) and (ii).

A raw material liquid prepared using the plant raw material of the item (i) and/or the item (ii) contains a component derived from the plant raw material of the item (i) and/or the item (ii). A raw material liquid prepared using the plant raw material of the item (iii) contains the plant raw material of the item (iii).

The barley and the barley-like plant may be, for example, one or more selected from a group consisting of barley, wheat, oats, and rye. A product obtained by germinating the barley and the barley-like plant is called malt. The malt may be, for example, malt of one or more selected from a group consisting of barley, wheat, oats, and rye.

The component of the item (iii) is not particularly limited as long as the component is derived from one or both of the items (i) and (ii). The component of the item (iii) may be, for example, one or more selected from a group consisting of proteins, peptides, amino acids, saccharides, lipids, vitamins, and minerals.

The raw material liquid may be prepared using a raw material containing hops. In this case, the raw material liquid may be prepared using a raw material containing: one or more selected from a group consisting of the items (i), (ii) and (iii), and hops. In those cases, the raw material liquid contains a hop-derived component.

The form of the hops to be used for the preparation of the raw material liquid is not particularly limited, and may be, for example, one or more selected from a group consisting of raw hops, pressed hops, hop powder, hop pellets, a hop extract, isomerized hops, low hops, tetra hops, and hexa hops. The variety of the hops to be used for the preparation of the raw material liquid is not particularly limited, and for example, hops for use in so-called kettle hopping are preferably used. In addition, the variety of the hops to be used for the preparation of the raw material liquid may be different from the variety of the hops that have been subjected to the acid treatment.

In the method of the present invention, the acid-treated hops may be added to a raw material liquid prepared through cooling after heating. That is, in this case, the acid-treated hops are added to a raw material liquid prepared through heating and subsequent cooling.

Specifically, when the raw material liquid is prepared, for example, using a raw material containing a plant raw material, the raw material liquid may be prepared by heating a mixed liquid obtained by mixing at least the plant raw material and water, and then cooling the mixed liquid. In this case, the heating temperature of the mixed liquid is not particularly limited, and the mixed liquid may be heated to, for example, a temperature of 30° C. or more and 100° C. or less, or a temperature of 50° C. or more and 95° C. or less.

In addition, the mixed liquid may be heated to, for example, a temperature (for example, 30° C. or more and 80° C. or less) that allows a digestive enzyme contained in the plant raw material and/or an externally added digestive enzyme (in this case, a mixed liquid obtained by mixing at least the plant raw material, the externally added digestive enzyme, and water, is heated) to act.

The digestive enzyme is not particularly limited as long as the digestive enzyme is an enzyme that digests a saccharide polymer (for example, starch, a trisaccharide, or a disaccharide) and/or an amino acid polymer (for example, a protein or a peptide) contained in the plant raw material. The digestive enzyme is preferably, for example, a starch degrading enzyme and/or a protein degrading enzyme.

More specifically, when the raw material liquid is prepared using a raw material containing malt, the raw material liquid may be prepared by saccharifying a mixed liquid obtained by mixing at least the malt and water, and then cooling the mixed liquid.

The saccharification is performed by, for example, heating a raw material liquid prepared by mixing at least the malt and water to a temperature (for example, 30° C. or more and 80° C. or less) that allows a digestive enzyme (for example, a starch degrading enzyme and/or a protein degrading enzyme) contained in the malt to act.

In addition, when the raw material liquid is prepared using a raw material containing hops, the raw material liquid may be prepared by boiling a mixed liquid prepared by mixing at least the hops and water, and then cooling the mixed liquid.

In addition, when the raw material liquid is prepared using a raw material containing malt and hops, the raw material liquid may be prepared by first saccharifying a mixed liquid obtained by mixing at least the malt and water, and then adding the hops and boiling the mixed liquid, followed by cooling of the mixed liquid.

The method of the present invention may include providing a ready-for-use raw material liquid that has been prepared in advance (for example, a raw material liquid prepared in advance that has been purchased from others), without preparing the raw material liquid. However, the method of the present invention may further include preparing the raw material liquid as described above.

That is, for example, when, in the method of the present invention, the acid-treated hops are added to the raw material liquid prepared through cooling after heating, the method of the present invention may use a ready-for-use raw material liquid that has been prepared through cooling after heating in advance (for example, a raw material liquid prepared through cooling after heating in advance that has been purchased from others) without performing the preparation of the raw material liquid including heating and cooling. However, the method of the present invention may further include heating the raw material liquid as described above, and cooling the raw material liquid after the heating. That is, in this case, the method of the present invention includes heating the raw material liquid, cooling the raw material liquid after the heating, and adding the acid-treated hops to the raw material liquid prepared through the cooling after the heating.

In the method of the present invention, the acid-treated hops are added to the raw material liquid, to thereby impart an aroma derived from the acid-treated hops to the raw material liquid. That is, in the method of the present invention, dry hopping may be performed by, for example, adding the acid-treated hops to the raw material liquid prepared through cooling after heating.

A method of adding the acid-treated hops to the raw material liquid is not particularly limited as long as the method is a method by which an aroma derived from the acid-treated hops is imparted to the raw material liquid. For example, when the acid treatment is performed by mixing the treatment liquid and hops as described above, at least part of the treatment liquid after the acid treatment containing the hops may be added to the raw material liquid. In this case, at least part of the treatment liquid after the acid treatment containing a solid component of the hops may be added to the raw material liquid.

Specifically, for example, when hop pellets subjected to acid treatment are added to the raw material liquid, at least part of the treatment liquid after the acid treatment containing the hop pellets may be added to the raw material liquid prepared through cooling after heating. In this case, the hop pellets contained in the treatment liquid after the acid treatment are softened by water absorption, and hence the treatment liquid after the acid treatment, which is a slurry composition containing the hop pellets, is added to the raw material liquid.

For example, the pH of the treatment liquid after the acid treatment containing the hops may be 5.5 or less, and is preferably 5.2 or less, more preferably 5.0 or less, still more preferably 4.6 or less, particularly preferably 4.5 or less. The lower limit value of the pH of the treatment liquid after the acid treatment is not particularly limited, and the pH may be, for example, 1.0 or more, 2.0 or more, or 2.5 or more.

The method of the present invention may further include adding yeast to the raw material liquid to perform alcoholic fermentation. The alcoholic fermentation is started by adding yeast to the raw material liquid. The density of the yeast in the raw material liquid at the time of the start of the alcoholic fermentation may be, for example, from $1 \times 10^6$ cells/mL to $3 \times 10^9$ cells/mL. The yeast is not particularly limited as long as the yeast performs alcoholic fermentation. The yeast may be, for example, one or more selected from a group consisting of beer yeast, wine yeast, shochu yeast, and sake yeast. In this embodiment, the alcoholic fermentation corresponds to main fermentation or primary fermentation in the production of beer or the like. In addition, the method of the present invention may further include performing maturation after the alcoholic fermentation. In this embodiment, the maturation corresponds to storage or secondary fermentation in the production of beer or the like.

A time at which the acid-treated hops are added to the raw material liquid is not particularly limited as long as the time is a time after the preparation of the raw material liquid at which an aroma derived from the acid-treated hops is imparted. That is, for example, when, in the method of the present invention, the acid-treated hops are added to the raw material liquid prepared through cooling after heating, a time at which the acid-treated hops are added to the raw material liquid is not particularly limited as long as the time is a time after heating and cooling of the raw material liquid during its preparation at which an aroma derived from the acid-treated hops is imparted.

That is, for example, when the method of the present invention further includes adding yeast to the raw material liquid to perform alcoholic fermentation (for example, when the method further includes adding yeast to the raw material liquid prepared through cooling after heating to perform alcoholic fermentation), the acid-treated hops may be added by the end of the alcoholic fermentation.

In this case, the method of the present invention includes adding yeast to the raw material liquid to perform alcoholic fermentation, and adding the acid-treated hops to the raw material liquid by the end of the alcoholic fermentation.

Specifically, the acid-treated hops may be added to the raw material liquid at, for example, one or more times selected from a group consisting of a time before the start of the alcoholic fermentation (for example, before the addition of the yeast to the raw material liquid), the time of the start of the alcoholic fermentation (for example, at the time of the addition of the yeast to the raw material liquid), a time during the alcoholic fermentation (for example, after the addition of the yeast to the raw material liquid), and a time at the end of the alcoholic fermentation.

In addition, for example, when the method of the present invention further includes performing alcoholic fermentation, and performing maturation after the alcoholic fermentation, the hops that have been subjected to the acid treatment may be added before the start of the maturation.

In this case, the method of the present invention includes adding yeast to the raw material liquid to perform alcoholic fermentation, performing maturation after the alcoholic fermentation, and adding the acid-treated hops to the raw material liquid before the start of the maturation.

Specifically, the acid-treated hops may be added to the raw material liquid at, for example, one or more times selected from a group consisting of a time before the start of the alcoholic fermentation (for example, before the addition of the yeast to the raw material liquid), the time of the start of the alcoholic fermentation (for example, at the time of the addition of the yeast to the raw material liquid), a time during the alcoholic fermentation (for example, after the addition of the yeast to the raw material liquid), a time at the end of the alcoholic fermentation, and a time after the end of the alcoholic fermentation and before the start of the maturation.

The temperature of the raw material liquid at the time of the addition of the acid-treated hops is not particularly limited, and the acid-treated hops may be added to, for example, the raw material liquid at 5° C. or more and 90° C. or less, the raw material liquid at 5° C. or more and 70° C. or less, the raw material liquid at 5° C. or more and 50° C. or less, the raw material liquid at 5° C. or more and 30° C. or less, or the raw material liquid at 10° C. or more and 20° C. or less.

In the method of the present invention, a beverage is finally produced using the raw material liquid after the addition of the acid-treated hops. That is, for example, when the method of the present invention includes performing alcoholic fermentation as described above, the beverage is obtained using the raw material liquid after the addition of the acid-treated hops and after the alcoholic fermentation.

In addition, when the method of the present invention includes performing alcoholic fermentation and subsequently performing maturation as described above, the beverage is obtained using the raw material liquid after the addition of the acid-treated hops and after the maturation. Specifically, the beverage may be obtained by, for example, subjecting the raw material liquid after the addition of the acid-treated hops, and after the alcoholic fermentation or after the maturation at least to filtration treatment and/or sterilization treatment.

In addition, the method of the present invention may be free of heat sterilization after the addition of the acid-treated hops to the raw material liquid. In this case, a flavor imparted by adding the acid-treated hops to the raw material liquid is effectively maintained.

In addition, the method of the present invention may be free of filtration treatment after the addition of the acid-treated hops to the raw material liquid. In this case, a flavor imparted by adding the acid-treated hops to the raw material liquid is effectively maintained.

In addition, in the method of the present invention, the beverage may be produced without alcoholic fermentation. In this case, the beverage is obtained using the raw material liquid after the addition of the acid-treated hops. Specifically, the beverage may be obtained by, for example, subjecting the raw material liquid after the addition of the acid-treated hops at least to one or more selected from a group consisting of addition of another component, filtration treatment, and sterilization treatment.

The other component to be added to the raw material liquid after the addition of the acid-treated hops may be, for example, one or more selected from a group consisting of saccharides, dietary fiber, acidulants, dyes, flavoring agents, sweeteners, and bittering agents.

The beverage to be produced by the method of the present invention is not particularly limited as long as the beverage is a beverage having an aroma derived from the above-mentioned acid-treated hops. The method of the present invention may be, for example, a method of producing a sparkling beverage. In this embodiment, the sparkling beverage is a beverage having foam properties including a foam-forming property and a foam-stability. That is, it is preferred that the sparkling beverage be, for example, a beverage containing a carbon dioxide gas and having: a foam-forming property for forming a foam layer on the top of a liquid surface when poured into a container, such as a glass; and a foam-stability for holding the formed foam for a certain period of time or longer.

The sparkling beverage may have a carbon dioxide gas pressure equal to or higher than a predetermined value. Specifically, the carbon dioxide gas pressure of the sparkling beverage may be, for example, 1.0 kg/cm$^2$ or more, or 2.0 kg/cm$^2$ or more. The upper limit value of the carbon dioxide gas pressure of the sparkling beverage is not particularly limited, and the carbon dioxide gas pressure may be, for example, 3.0 kg/cm$^2$ or less.

The sparkling beverage may have, for example, a NIBEM value of 50 or more. The NIBEM value is used as an indicator of the foam-stability of a sparkling beverage, such as beer. The NIBEM value is evaluated as a period of time (seconds) required for reducing the height of foam, which is formed when the sparkling beverage is poured into a predetermined container, by a predetermined amount. Specifically, the NIBEM value of the sparkling beverage is measured in accordance with a method described in the literature: "Methods of Analysis of BCOJ (Enlarged and Revised Edition) (2013) (edited by Brewery Convention of Japan (Analysis Committee), Brewers Association of Japan, publishing office: The Brewing Society of Japan)," "8.29 Foam-Foam-stability Measurement Method using NIBEM-T-."

The sparkling beverage may be a beer-taste beverage. In this embodiment, the beer-taste beverage is a sparkling beverage having a beer-like flavor. That is, the beer-taste beverage may be, for example, beer, low-malt beer, or a sparkling beverage containing low-malt beer and an alcohol component, such as spirits. However, as described later, the beer-taste beverage is not particularly limited as long as the beer-taste beverage is a sparkling beverage having a beer-like flavor irrespective of its alcohol content, whether or not malt is used, and whether or not alcoholic fermentation is performed.

In the method of the present invention, a method of imparting foam properties to the beverage is not particularly limited, and the foam properties may be imparted by, for example, one or more selected from a group consisting of alcoholic fermentation, use of carbonated water, and use of carbon dioxide gas.

The method of the present invention may be a method of producing an alcoholic beverage. In this case, the method of the present invention may include performing alcoholic fermentation, or may include performing alcoholic fermentation and maturation.

In this embodiment, the alcoholic beverage is a beverage having an alcohol content of 1 vol % or more (alcohol percentage of 1% or more). The alcohol content of the alcoholic beverage is not particularly limited as long as the alcohol content is 1 vol % or more. The alcohol content may be, for example, from 1 vol % to 20 vol %. The alcoholic beverage may be a beer-taste beverage.

The alcoholic beverage may be a sparkling alcoholic beverage. The sparkling alcoholic beverage is an alcoholic beverage having the above-mentioned foam properties. The sparkling alcoholic beverage may be a beer-taste beverage (for example, a sparkling alcoholic beverage selected from a group consisting of beer, low-malt beer, and a sparkling beverage containing low-malt beer and an alcohol component, such as spirits).

The method of the present invention may be a method of producing a non-alcoholic beverage. In this case, the method of the present invention may be a method of producing a non-alcoholic beverage without performing alcoholic fermentation. The non-alcoholic beverage may be a beer-taste beverage.

In this embodiment, the non-alcoholic beverage is a beverage having an alcohol content of less than 1 vol %. The alcohol content of the non-alcoholic beverage is not particularly limited as long as the alcohol content is less than 1 vol %. The alcohol content may be, for example, less than 0.5 vol %, less than 0.05 vol %, or less than 0.005 vol %. The non-alcoholic beverage may be a sparkling non-alcoholic beverage. The sparkling non-alcoholic beverage may be a beer-taste beverage.

Next, specific Examples according to the embodiments of the present invention are described.

EXAMPLE 1

First, a raw material liquid cooled after boiling (cooled wort) was prepared using raw materials containing barley malt, hops, and water. Specifically, a mixed liquid obtained by mixing the raw materials except for the hops was kept at 65° C. to be saccharified. Further, the hops were added to the mixed liquid after the saccharification, followed by boiling. The mixed liquid after the boiling was cooled to provide a raw material liquid at about 20° C.

Meanwhile, acid treatment of hops was performed. As the hops to be subjected to the acid treatment, hop pellets of the Cascade variety were used, which is a variety different from the hops used for the preparation of the raw material liquid. First, lactic acid was added to brewing water to prepare a plurality of treatment liquids that were different from each other in pH because of different lactic acid concentrations. Subsequently, 2 g/L of the hop pellets were added to each treatment liquid, and immersed therein. Each treatment liquid containing the hop pellets was kept at room temperature for 30 minutes. Thus, the acid treatment was performed. Each treatment liquid after the acid treatment was a slurry composition containing the hop pellets softened by water absorption.

After that, dry hopping was performed by adding the hop pellets subjected to the acid treatment immediately before the start of alcoholic fermentation. That is, first, each treatment liquid after the acid treatment containing the hop pellets was added to the cooled raw material liquid. After that, the alcoholic fermentation was performed on a scale of about 2.5 L using an EBC fermentation tube. That is, the alcoholic fermentation was started by adding top-fermenting beer yeast to the raw material liquid containing the hop pellets subjected to the acid treatment. After the alcoholic fermentation, maturation was further performed.

Then, the fermentation liquid after the maturation was filtered to provide an alcoholic beverage (beer) having an alcohol content of about 5.5 vol %. In addition, for comparison, beer was produced in the same manner except that brewing water, to which no lactic acid is added, was used as it was in place of the treatment liquid.

Then, each of the beers produced as described above was subjected to sensory evaluation by five experienced panelists. In the sensory evaluation, each of the panelists gave a score of "1", "2", "3", "4", or "5" for each of the following items: "smooth feeling", "beer-like taste", "bitter harshness", and "resinous odor".

In addition, the treatment liquid before the addition of the hops, the treatment liquid after the acid treatment containing the hops, and the raw material liquid to which the treatment liquid after the acid treatment containing the hops has been added, which were used for the production of beer, were each measured for its pH. In addition, the acetaldehyde content of each of the beers was also measured. The acetaldehyde content was measured in accordance with a method described in the literature: "Methods of Analysis of BCOJ (Enlarged and Revised Edition) (2013) (edited by Brewery Convention of Japan (Analysis Committee), Brewers Association of Japan, publishing office: The Brewing Society of Japan)," "8.22 Low-boiling-point Aroma Component."

FIG. 1 shows, for each of Example 1-1 to Example 1-5, the acid addition amount (w/v %) at the time of the preparation of the treatment liquid, the pH of each of the treatment liquid before the addition of the hops ("TREATMENT LIQUID" in FIG. 1), the treatment liquid after the acid treatment containing the hops ("TREATMENT LIQUID+ HOPS" in FIG. 1), and the raw material liquid to which the treatment liquid after the acid treatment containing the hops has been added ("TREATMENT LIQUID+HOPS+RAW MATERIAL LIQUID" in FIG. 1), the results of the sensory test, and the acetaldehyde content (ppm) of the beer.

In the sensory evaluation results shown in FIG. 1, a higher score is a more preferred evaluation for each of the "smooth feeling" and the "beer-like taste", and a lower score is a more preferred evaluation for each of the "bitter harshness" and the "resinous odor". In addition, the scores for the sensory evaluation shown in FIG. 1 are each a value calculated by dividing the total value of scores given by five panelists by the number of the panelists.

As shown in FIG. 1, the beers of Example 1-2 to Example 1-5, each of which was produced by performing dry hopping using the acid-treated hops, were each reduced in acetaldehyde content and evaluated as having a flavor in which the smooth feeling and the beer-like taste were enhanced, and the bitter harshness and the resinous odor were reduced, compared to the beer of Example 1-1 using brewing water in place of the treatment liquid.

That is, it was shown that the flavor of beer was improved by performing dry hopping using the acid-treated hops compared to the case of performing dry hopping using hops that had not been subjected to acid treatment.

In particular, the beers of Example 1-3 to Example 1-5, in each of which the acid addition amount at the time of the preparation of the treatment liquid was more than 0.10 w/v % (specifically 0.25 w/v % or more), the pH of the treatment liquid was less than 3.0 (specifically 2.7 or less), and the pH of the treatment liquid after the acid treatment containing the hops was less than 5.2 (specifically 4.6 or less), were each evaluated as having a remarkably improved flavor.

Sensory evaluation results similar to the results of Example 1-4 shown in FIG. 1 were obtained for beer produced in the same manner as in Example 1-4 except that the period of time of the acid treatment was 5 minutes, though the results are not shown.

EXAMPLE 2

A raw material liquid cooled to about 2° C. after boiling (cooled wort) was prepared in the same manner as in Example 1 described above. In addition, acid treatment of hops was performed. As the hops to be subjected to the acid treatment, hop pellets of the Cascade variety were used.

First, in the same manner as in Example 1 described above, lactic acid was added to brewing water to prepare a plurality of treatment liquids that were different from each other in pH because of different lactic acid concentrations. Subsequently, 2 g/L of the hop pellets were added to each treatment liquid, and immersed therein. Each treatment liquid containing the hop pellets was kept at room temperature for 30 minutes. Thus, the acid treatment was performed.

After that, a non-alcoholic beverage was obtained by performing dry hopping using the hop pellets subjected to the acid treatment without alcoholic fermentation. That is, dry hopping was performed by adding the treatment liquid after the acid treatment containing the hop pellets to the cooled raw material liquid, and keeping the resultant at room temperature for 30 minutes.

Further, the raw material liquid after the dry hopping was filtered and mixed with drinking water (raw material liquid: drinking water=3:1 (volume ratio)) to provide a non-alcoholic beverage having an alcohol content of less than 0.005 vol %. In addition, for comparison, a non-alcoholic beverage was produced in the same manner except that brewing water was used as it was in place of treatment liquid. Then, the non-alcoholic beverages produced as described above were each subjected to sensory evaluation in the same manner as in Example 1 described above except that the number of panelists was three.

In FIG. 2, for each of Example 2-1 to Example 2-5, the acid addition amount (w/v %) at the time of the preparation of the treatment liquid, and the results of the sensory test, are shown. As shown in FIG. 2, the non-alcoholic beverages of Example 2-2 to Example 2-5, each of which was produced by performing dry hopping using the acid-treated hops, were each evaluated as having a flavor in which the smooth feeling and the beer-like taste were enhanced, and the bitter harshness was reduced, compared to the non-alcoholic beverage of Example 2-1 using brewing water in place of the treatment liquid.

That is, it was shown that the flavor of anon-alcoholic beverage was improved by performing dry hopping using the acid-treated hops compared to the case of performing dry hopping using hops that had not been subjected to acid treatment.

In particular, the non-alcoholic beverages of Example 2-3 to Example 2-5, in each of which the acid addition amount at the time of the preparation of the treatment liquid was more than 0.10 w/v % (specifically 0.25 w/v % or more), were each evaluated as having a remarkably improved flavor.

EXAMPLE 3

A raw material liquid cooled to about 18° C. after boiling (cooled wort) was prepared in the same manner as in Example 1 described above. In addition, acid treatment of hops was performed. As the hops to be subjected to the acid treatment, hop pellets of the Cascade variety were used.

First, in the same manner as in Example 1 described above, 0.50 w/v % of lactic acid, phosphoric acid, or malic acid was added to brewing water to prepare a plurality of treatment liquids using different kinds of acids. The treatment liquid prepared by adding 0.50 w/v % of phosphoric acid had a pH (20.5° C.) of 1.7. In addition, the treatment liquid prepared by adding 0.50 w/v % of malic acid had a pH (20.6° C.) of 2.6. Subsequently, 2 g/L of the hop pellets were added to each treatment liquid, and immersed therein. Each treatment liquid containing the hop pellets was kept at room temperature for 30 minutes. Thus, the acid treatment was performed.

After that, first, each treatment liquid after the acid treatment containing the hop pellets was added to the cooled raw material liquid. Subsequently, the alcoholic fermentation was performed on a scale of about 200 mL using a fermentation tube having a volume of about 200 mL. That is, the alcoholic fermentation was started by adding top-fermenting beer yeast to the cooled raw material liquid after the addition of the acid-treated hops, and maturation was further performed after the alcoholic fermentation.

Then, the fermentation liquid after the maturation was filtered to provide beer having an alcohol content of about 5.0 vol %. In addition, for comparison, beer was produced in the same manner except that brewing water, to which no acid was added, was used as it was in place of treatment liquid. In addition, the beers produced as described above were each subjected to sensory evaluation in the same manner as in Example 1 described above except that the number of panelists was three.

In FIG. 3, for each of Example 3-1 to Example 3-4, the kind of the acid used for the preparation of the treatment liquid, and the results of the sensory test are shown. As shown in FIG. 3, the beers of Example 3-2 to Example 3-4, each of which was produced by performing dry hopping using the acid-treated hops, were each evaluated as having a flavor in which the smooth feeling and the beer-like taste were enhanced, and the bitter harshness and the resinous odor were reduced, compared to the beer of Example 3-1 using brewing water in place of the treatment liquid.

That is, it was shown that, irrespective of the kind of the acid used for the preparation of the treatment liquid, the flavor of beer was improved by performing dry hopping using the acid-treated hops compared to the case of performing dry hopping using hops that had not been subjected to acid treatment.

EXAMPLE 4

A raw material liquid cooled to about 18° C. after boiling (cooled wort) was prepared in the same manner as in Example 1 described above. In addition, acid treatment of hops was performed. As the hops to be subjected to the acid treatment, hop pellets of 14 varieties (Galaxy variety, Citra variety, Polaris variety, Apollo variety, Saaz variety, Tradition variety, Sorachi Ace variety, Barbe Rouge variety, Mandarina Bavaria variety, Mosaic variety, Nelson Sauvin variety, Shinshuwase variety, Furano No. 18 variety, and Little Star variety) were used, which are different from any of the hops used for the preparation of the raw material liquid, and the Cascade variety used for dry hopping in each of the Examples described above.

First, in the same manner as in Example 1 described above, 0.50 w/v % of lactic acid was added to brewing water to prepare a treatment liquid. Subsequently, 2 g/L of any one of the hop pellets of 14 varieties were added to each treatment liquid, and immersed therein. Each treatment liquid containing the hop pellets was kept at room temperature for 30 minutes. Thus, the acid treatment was performed.

After that, first, each treatment liquid after the acid treatment containing the hop pellets was added to the cooled raw material liquid. Subsequently, the alcoholic fermentation was performed on a scale of about 200 mL using a fermentation tube having a volume of about 200 mL. That is, the alcoholic fermentation was started by adding top-fermenting beer yeast to the cooled raw material liquid after the addition of the acid-treated hops, and maturation was further performed after the alcoholic fermentation.

Then, the fermentation liquid after the maturation was filtered to provide beer having an alcohol content of about 5.0 vol %. In addition, for comparison, beer was produced in the same manner except that brewing water was used as it was in place of treatment liquid. In addition, the beers produced as described above were each subjected to sensory evaluation in the same manner as in Example 1 described above except that the number of panelists was three.

FIG. 4A shows, for each of Example 4-1C to Example 4-7C and Example 4-1 to Example 4-7, and FIG. 4B, for each of Example 4-8C to Example 4-14C and Example 4-8 to Example 4-14, the variety of the hops used for dry hopping, and the results of the sensory test. As shown in FIG. 4A and FIG. 4B, the beers of Example 4-1 to Example 4-14, each of which was produced by performing dry hopping using the acid-treated hops, were each evaluated as having a flavor in which the smooth feeling and the beer-like taste were enhanced, and the bitter harshness and the resinous odor were reduced, compared to the beers of Example 4-1C to Example 4-14C each using brewing water in place of the treatment liquid.

That is, it was shown that, irrespective of the variety of the hops used, the flavor of beer was improved by performing dry hopping using the acid-treated hops compared to the case of performing dry hopping using hops that had not been subjected to acid treatment.

EXAMPLE 5

A raw material liquid cooled to about 18° C. after boiling (cooled wort) was prepared in the same manner as in Example 1 described above. In addition, acid treatment of hops was performed. As the hops to be subjected to the acid treatment, hop pellets of the Cascade variety were used.

First, in the same manner as in Example 1 described above, 0.50 w/v % of lactic acid was added to brewing water to prepare a treatment liquid. Subsequently, 2 g/L of the hop pellets were added to each treatment liquid, and immersed therein. Each treatment liquid containing the hop pellets was kept at room temperature for 30 minutes. Thus, the acid treatment was performed.

After that, in Example 5-1, in the same manner as in Example 1 described above, dry hopping was performed by adding the hop pellets after the acid treatment immediately before the start of alcoholic fermentation. That is, to the cooled raw material liquid, first, the treatment liquid after the acid treatment containing the hop pellets was added, and then top-fermenting beer yeast was added to start the alcoholic fermentation. After 3 days of the alcoholic fermentation, maturation was further performed. Then, the fermentation liquid after the maturation was filtered to provide beer having an alcohol content of about 5.5 vol %.

Meanwhile, in Example 5-2, dry hopping was performed by adding the hop pellets subjected to the acid treatment during 3 days of alcoholic fermentation. That is, first, top-fermenting beer yeast was added to the cooled raw material liquid to start the alcoholic fermentation. Subsequently, after 2 days of the alcoholic fermentation (1 day before the end of the alcoholic fermentation), the treatment liquid after the acid treatment containing the hop pellets was added to the raw material liquid during the alcoholic fermentation. After the alcoholic fermentation, maturation was further performed. Then, the fermentation liquid after the maturation was filtered to provide beer having an alcohol content of about 5.5 vol %. In addition, the beers produced as described above were each subjected to sensory evaluation in the same manner as in Example 1 described above except that the number of panelists was three.

In FIG. 5, for each of Example 5-1 and Example 5-2, the time of addition of the acid-treated hops, and the results of the sensory test are shown. As shown in FIG. 5, in each of Example 5-1, in which dry hopping was performed by adding the acid-treated hops immediately before the start of the alcoholic fermentation, and Example 5-2, in which dry hopping was performed by adding the acid-treated hops during the alcoholic fermentation, the finally produced beer was evaluated as having a flavor in which the smooth feeling and the beer-like taste were enhanced, and the bitter harshness and the resinous odor were reduced.

That is, it was shown that the flavor of beer was improved by performing dry hopping using the acid-treated hops, irrespective of whether the time of addition of the acid-treated hops was immediately before the start of the alcoholic fermentation or during the alcoholic fermentation.

EXAMPLE 6

A raw material liquid cooled to about 18° C. after boiling (cooled wort) was prepared in the same manner as in Example 1 described above. In addition, acid treatment of hops was performed. As the hops to be subjected to the acid treatment, hop pellets of the Cascade variety were used.

First, in the same manner as in Example 1 described above, 0.50 w/v % of lactic acid was added to brewing water to prepare a treatment liquid. Subsequently, in Example 6-1, in the same manner as in Example 1 described above, 2 g/L of the hop pellets were added to the treatment liquid, and immersed therein. The treatment liquid containing the hop pellets was kept at room temperature for 30 minutes without heating. Thus, the acid treatment was performed.

Meanwhile, in Example 6-2 and Example 6-3, the acid treatment was performed in the following manner. After the addition of 2 g/L of the hop pellets to each of the treatment liquids, the treatment liquids containing the hop pellets were heated, and kept at 60° C. for 30 minutes and at 90° C. for 30 minutes, respectively. After that, the heating was stopped, and each treatment liquid was left to stand until the temperature became room temperature.

In addition, in Example 6-4, the acid treatment was performed in the following manner. After the addition of 2 g/L of the hop pellets to the treatment liquid, the treatment liquid containing the hop pellets was first kept at room temperature for 29 minutes without heating, and then the treatment liquid was heated and kept at 90° C. for 1 minute. After that, the heating was stopped, and the treatment liquid was left to stand until the temperature became room temperature.

After that, first, each treatment liquid after the acid treatment containing the hop pellets was added to the cooled raw material liquid. Subsequently, the alcoholic fermentation was performed on a scale of about 200 mL using a fermentation tube having a volume of about 200 mL. That is, the alcoholic fermentation was started by adding top-fermenting beer yeast to the cooled raw material liquid after the addition of the acid-treated hops, and maturation was further performed after the alcoholic fermentation.

Then, the beers produced as described above were each subjected to sensory evaluation in the same manner as in Example 1 described above except that: the number of panelists was three; and evaluation for an "aroma specific to flavor hops" was also performed.

In FIG. 6, for each of Example 6-1 to Example 6-4, heating conditions at the time of the acid treatment and the results of the sensory test are shown. As shown in FIG. 6, the beers of Example 6-1 to Example 6-4, each of which was produced by performing dry hopping using the acid-treated hops, were each evaluated as having a flavor in which the smooth feeling and the beer-like taste were enhanced, and the bitter harshness and the resinous odor were reduced. That is, it was shown that, irrespective of whether or not the heating was performed at the time of the acid treatment, the flavor of beer was improved by performing dry hopping using the acid-treated hops.

In addition, the beers of Example 6-2 to Example 6-4, each of which was produced by performing dry hopping using the hops that have been subjected to the acid treatment under heating, were each evaluated as having an increased degree of the aroma specific to flavor hops (specifically citrus aroma specific to the Cascade variety) compared to the beer of Example 6-1 produced by performing dry hopping using the hops that have been subjected to the acid treatment without being heated. That is, it was shown that the aroma specific to flavor hops was effectively enhanced in beer by performing dry hopping using the hops that have been subjected to the acid treatment under heating.

The invention claimed is:

1. A method of producing a beverage using a raw material liquid, the method comprising:
    obtaining a composition comprising hop pellets that have been subjected to an acid treatment; and
    adding the composition comprising the hop pellets that have been subjected to the acid treatment to the raw material liquid,
    wherein the acid treatment comprises mixing an aqueous solution including acid with the hop pellets.

2. The method of producing a beverage according to claim 1, further comprising heating and cooling the raw material liquid before said adding of the composition comprising the hop pellets that have been subjected to the acid treatment.

3. The method of producing a beverage according to claim 1, wherein the acid solution has a pH of 2.9 or less.

4. The method of producing a beverage according to claim 1, the method further comprising adding yeast to the raw material liquid to perform alcoholic fermentation.

5. The method of producing a beverage according to claim 4, wherein the composition is added to the raw material liquid by end of the alcoholic fermentation.

6. The method of producing a beverage according to claim 4, the method further comprising performing maturation after the alcoholic fermentation,
    wherein the composition is added to the raw material liquid before start of the maturation.

7. The method of producing a beverage according to claim 1, wherein the beverage is a sparkling beverage.

8. The method of producing a beverage according to claim 1, wherein the method is free of heat sterilization after the hop pellets that have been subjected to the acid treatment are added to the raw material liquid.

9. The method of producing a beverage according to claim 1,
    wherein the composition has a pH of 4.6 or less.

10. The method of producing a beverage according to claim 5, wherein the composition has a pH of 4.6 or less and is added by end of the alcoholic fermentation.

11. The method of producing a beverage according to claim 6, wherein the composition has a pH of 4.6 or less and is added before start of the maturation.

12. The method of producing a beverage according to claim 1, wherein the composition comprises an acid solution comprises one or more selected from a group consisting of lactic acid, phosphoric acid, malic acid, sulfurous anhydride, tartaric acid, acetic acid, and citric acid.

13. The method of producing a beverage according to claim 1, wherein a temperature of the acid treatment is 5° C. or more and 100° C. or less.

14. The method of producing a beverage according to claim 1, wherein the acid treatment comprises keeping the hop pellets immersed in the aqueous solution including acid for 3 minutes or more.

15. A method of producing a beverage using a raw material liquid, the method comprising:
obtaining a composition comprising a solid component of hops that have been subjected to an acid treatment; and
adding the composition comprising the solid component of the hops that have been subjected to the acid treatment to the raw material liquid,
wherein the hops are filtered only after the adding step, and
wherein the acid treatment comprises mixing an aqueous solution including acid with the hops.

16. The method of producing a beverage according to claim 15, further comprising heating and cooling the raw material liquid before said adding of the composition.

17. The method of producing a beverage according to claim 15, wherein the solid component comprises one or more selected from the group consisting of raw hops, pressed hops, and hop pellets that have been subjected to the acid treatment.

18. The method of producing a beverage according to claim 15, wherein the method is free of heat sterilization after the solid component that have been subjected to the acid treatment are added to the raw material liquid.

19. The method of producing a beverage according to claim 15, wherein the beverage is alcoholic.

20. The method of producing a beverage according to claim 1, wherein the beverage is alcoholic.

* * * * *